United States Patent [19]

Collins et al.

[11] Patent Number: 4,910,770
[45] Date of Patent: Mar. 20, 1990

[54] NETWORK INTERFACE DEVICE AND ENCLOSURE

[75] Inventors: Thomas J. Collins, Wall; Donald C. Stier, Brick; Thomas G. Graham, Ocean; Joseph P. Bevacqua, Paterson, all of N.J.

[73] Assignee: Keptel, Inc., Tinton Falls, N.J.

[21] Appl. No.: 275,349

[22] Filed: Nov. 22, 1988

Related U.S. Application Data

[63] Continuation of Ser. No. 879,940, Jun. 30, 1986, abandoned.

[51] Int. Cl.$^4$ .................. H04M 9/00; H04M 1/00
[52] U.S. Cl. ........................... 379/399; 361/356; 379/412
[58] Field of Search .............. 379/399, 412, 327; 361/56, 119, 91, 356; 439/133, 134, 352, 676, 344, 299, 300, 309, 277, 345, 660; D14/140, 240

[56] References Cited

U.S. PATENT DOCUMENTS

| | | | |
|---|---|---|---|
| 4,560,839 | 12/1985 | Dillard | 379/399 |
| 4,588,238 | 5/1986 | Mickelson et al. | 439/277 |
| 4,613,732 | 9/1986 | Cwirzen et al. | 361/119 X |
| 4,651,340 | 3/1987 | Marson | 379/156 |
| 4,729,059 | 3/1988 | Wang | 361/356 |
| 4,742,541 | 5/1988 | Cwirzen et al. | 379/412 |
| 4,800,588 | 1/1989 | Poster, Jr. | 379/412 |

OTHER PUBLICATIONS

"SNI-2200 Features", 6-1984, Keptel [379-399].

*Primary Examiner*—Jin F. Ng
*Assistant Examiner*—Randall S. Vaas
*Attorney, Agent, or Firm*—R. Gale Rhodes, Jr.

[57] ABSTRACT

A network interface device and enclosure adapted to interconnect incoming telephone wiring to subscriber premises wiring. The device, according to one embodiment, comprises first electrical terminals adapted to be connected to the subscriber premises wiring, second electrical terminals adapted to be connected to the incoming telephone wiring, a removable module disposed between the first and second electrical terminals, the module having space for a telephone circuit and the module having electrical connections for connecting the module with the second terminal; a cable coupled to the first terminals, the cable including a plug at an end of the cable distant from the first terminals, and a jack located on the module adapted to receive the plug, the jack being electrically coupled to the electrical connections for connecting the module with the second terminal. The network interface device may be disposed within an enclosure and the enclosure may have individual access panels so that an individual subscriber can access its terminals and not the terminals of other subscribers.

14 Claims, 13 Drawing Sheets

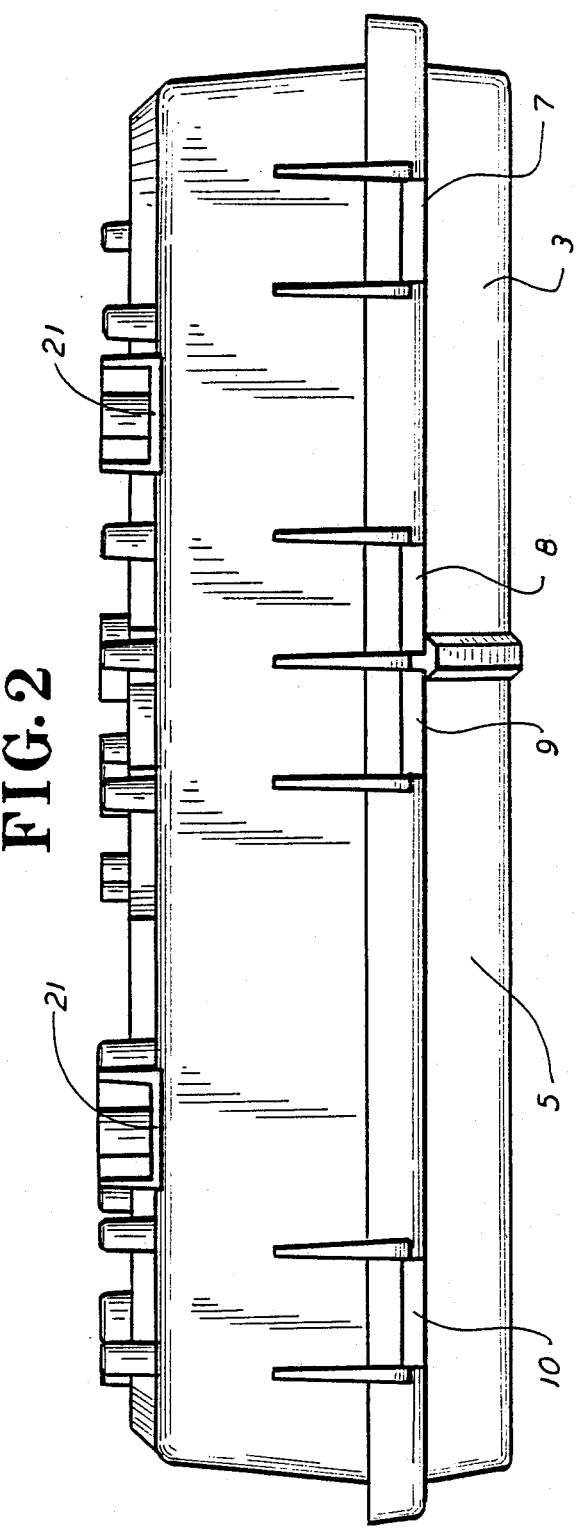
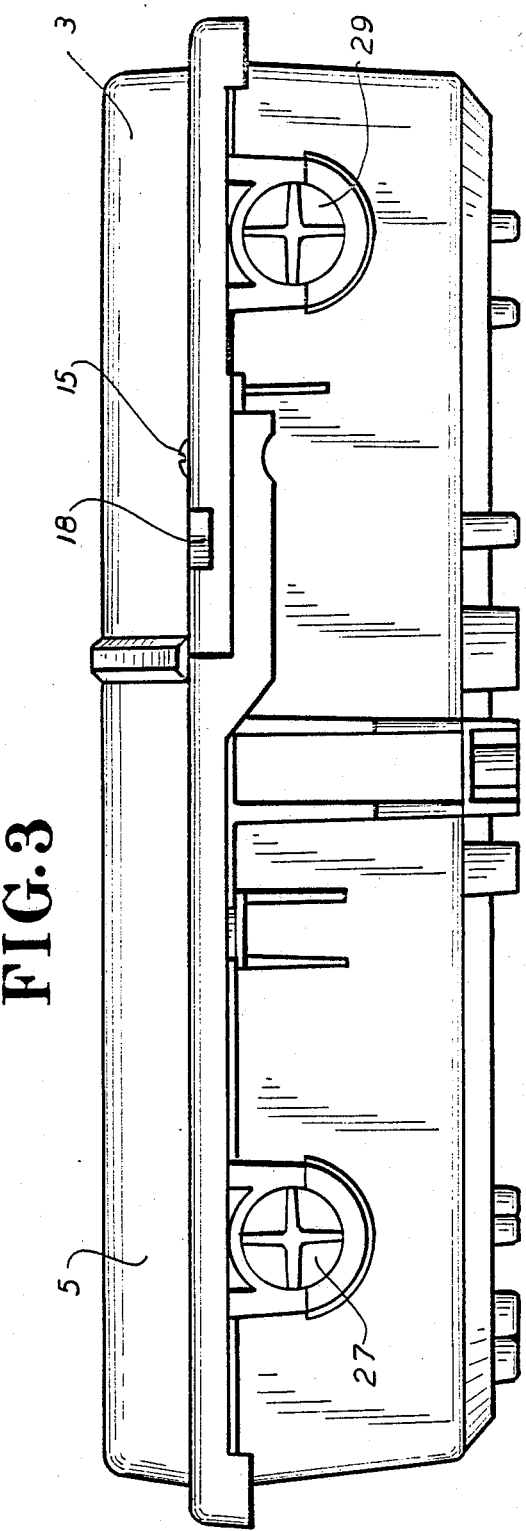

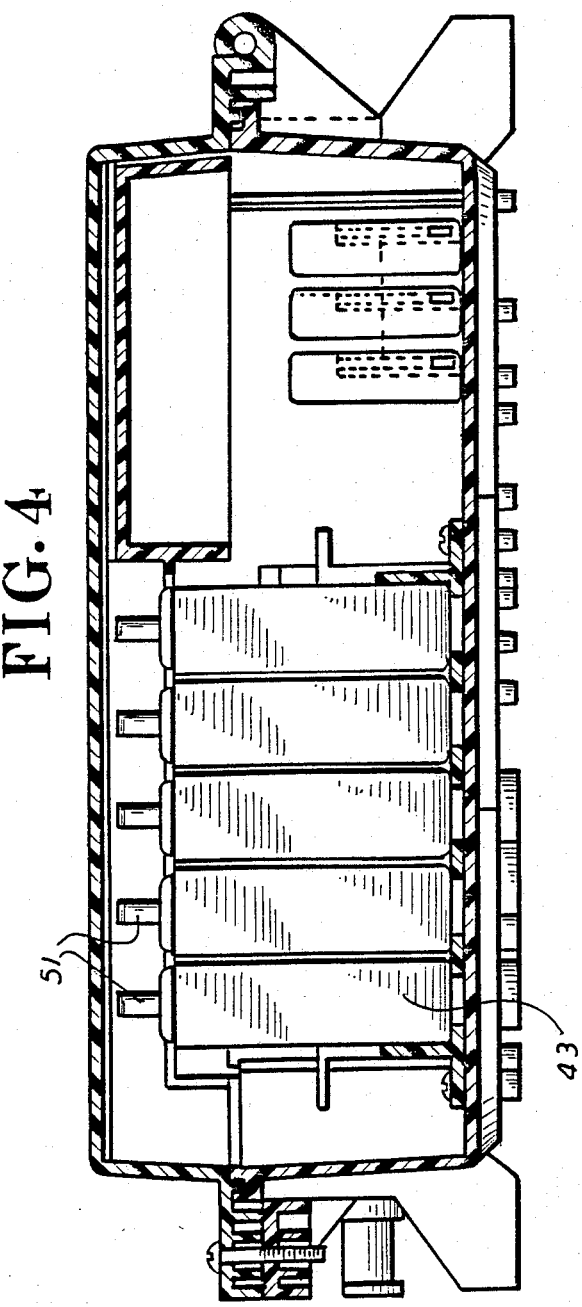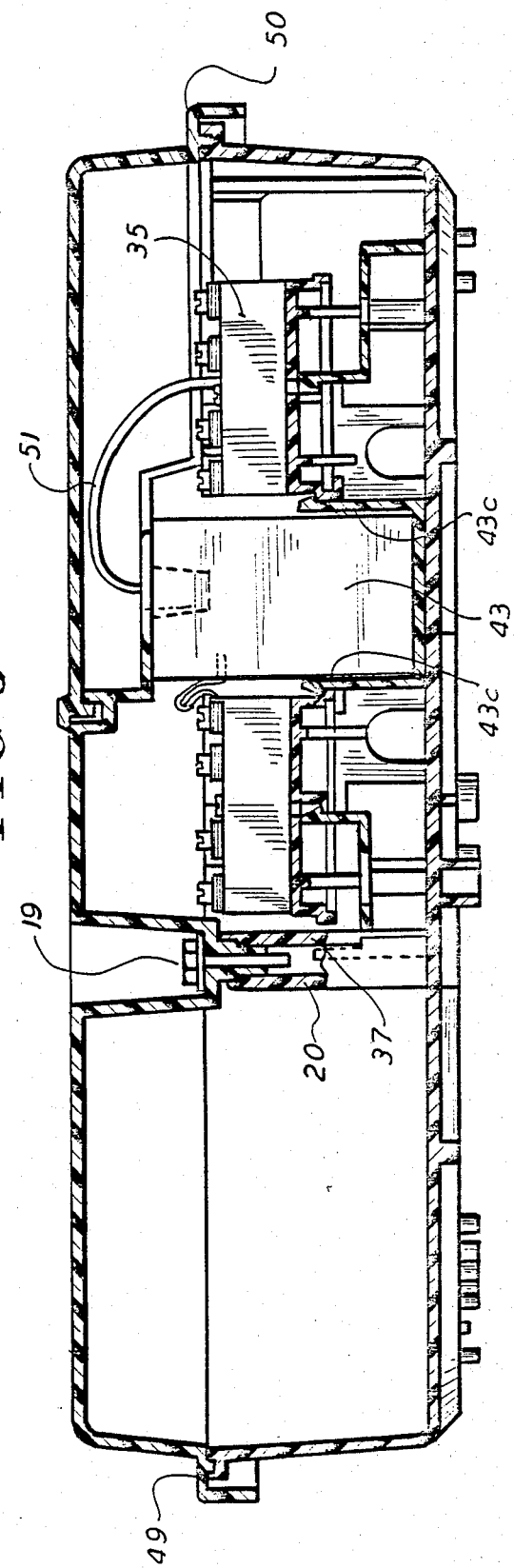

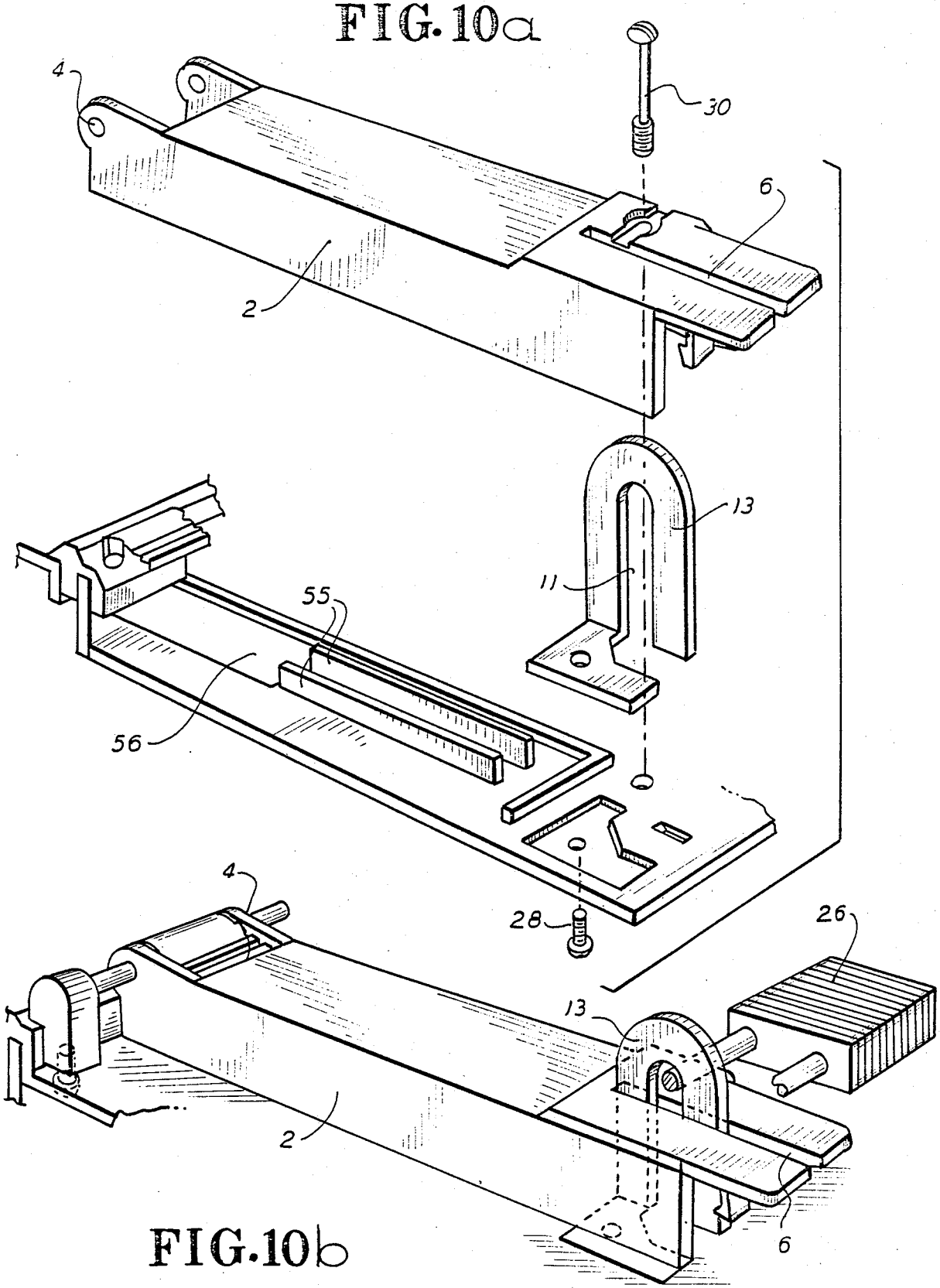

NETWORK INTERFACE DEVICE AND ENCLOSURE

This is a continuation of application Ser. No. 879,940 filed Jun. 30, 1986, now abandoned.

CROSS REFERENCE TO RELATED APPLICATIONS

This application is related to U.S. application Ser. No. 834,736, filed Feb. 28, 1986, in the names of Thomas J. Collins and Pina Schneider and commonly owned by the assignee of this application.

BACKGROUND OF THE INVENTION

The present invention relates to network interface devices and enclosures for connecting incoming telephone lines to subscriber owned telephone wiring located on the subscriber's premises. More specifically, the invention described herein relates to network interface devices and modules for use in network interface enclosures, and to network interface enclosures that selectively allow for both individual subscriber and telephone company personnel access.

Since the deregulation of the telephone industry, it has become important to provide a clearly defined demarcation point between the incoming telephone lines and the subscriber-owned wiring located on the subscriber's premises. One reason for this is that it is important to be able to determine whether problems in telephone wiring exist in the telephone company owned portion of the wiring or in the subscriber's house wiring, since defects or faults in the subscriber's house wiring generally are the responsibility of the subscriber and not the telephone company. Accordingly, as described and claimed in related U.S. application Ser. No. 834,736 filed Feb. 28, 1986, a network interface device allows for removable interconnection of the telephone company owned wiring and the subscriber premises wiring and provides the ability to test for proper telephone operation at the demarcation point thus enabling the subscriber or telephone company personnel to conveniently make a determination whether a fault exists in the subscriber wiring or in the telephone company owned wiring when a problem arises.

According to the present invention, a network interface module used in conjunction with a network interface device, such as the apparatus described in U.S. application Ser. No. 834,736, provides a convenient location for various telephone circuits such as Maintenance Termination Units (MTU's), Half-Ringers, Remote Isolation Devices (RID's), etc., and additionally facilitates the removal and replacement of such circuits when found defective. In another aspect of the present invention, individual access panels on the cover of the network interface enclosure allows for convenient individual subscriber access for testing. Thus, for example, in multi-dwelling housing complexes, the network interface test location for a particular subscriber may be accessed without allowing tampering with other subscriber's circuitry.

SUMMARY OF THE INVENTION

It is an object of the present invention to provide a network interface device and enclosure for interconnecting telephone company wiring and subscriber premises wiring.

It is another object of the present invention to provide such a network interface device and enclosure which allows an individual subscriber to access only those terminals to which the subscriber premises wiring is connected and which prevents access to the telephone company terminal side. It is a further object of the invention to prevent access by one subscriber to the terminals of other subscribers.

It is furthermore an object of the present invention to provide a network interface device and enclosure which utilize convenient removable modules containing selected telephone circuitry. If the circuitry within a module is found defective, the module and enclosed circuitry can easily be removed and replaced. The module also provides a convenient testing location.

It is furthermore an object of the present invention to provide a network interface enclosure for telephone lines which allows a subscriber or telephone company personnel to determine, in the event of a fault, whether the fault exists in the subscriber premises wiring or in the telephone company lines or module circuits which are coupled to the network interface enclosure.

It is yet another object of the present invention to provide a telephone network interface enclosure which utilizes two main access covers, which may both be exposed to the exterior, for allowing access to the respective terminals contained within respective portions of the enclosure covered by the two access covers. When both access covers are closed, both the terminals to which the subscriber premises wiring and the terminals to which the incoming telephone lines are connected are enclosed. By opening the subscriber access cover, a subscriber obtains access only to the terminals connected to the subscriber premises wiring and does not obtain access to the terminals connected to the incoming telephone lines. Individual access doors on the main subscriber access cover allow for individual subscriber access to testing locations. One subscriber may gain access to the appropriate terminals in a multi-subscriber interface enclosure without gaining access to the terminals of other subscribers.

It is yet a further object of the present invention to provide a network interface enclosure which allows telephone company personnel, through the unfastening of a single fastener, to obtain complete access to the interior of the enclosure, including access to both the telephone company line connected terminals and the subscriber premises wiring terminals.

The invention also provides a network interface device for indoor use or for use in situations where complete isolation of the subscriber and telephone company terminals is not required. Accordingly, a separate cover may be hingably attached to the network interface device which covers the telephone company terminals, leaving the subscriber terminals exposed.

These and other objects are achieved according to one aspect of the present invention by a network interface device adapted to interconnect incoming telephone wiring to subscriber premises wiring comprising first electrical terminals adapted to be connected to the subscriber premises wiring; second electrical terminals adapted to be connected to the incoming telephone wiring; a removable module disposed between the first and second electrical terminals, the module having space for circuit means, and the module having connecting means for electrically connecting the module with the second terminals; cable means coupled to the first terminals, the cable means including a plug means at an end of the cable means distant from the first terminals; and jack means located on the module adapted removably to receive the plug means, the jack means being electrically coupled to the connecting means.

According to another aspect of the invention, the above objects are achieved by a network interface enclosure adapted to interconnect incoming telephone wiring to subscriber premises wiring comprising a base having a wall circumscribing a bottom portion of the base; a first cover covering only a portion of the base; a second cover covering the portion of the base not covered by the first cover; the first cover enclosing a portion of the base accessible to a telephone subscriber and which contains first electrical terminals adapted to be connected to the subscriber premises wiring; the second cover enclosing a portion of the base accessible to telephone company personnel and which contains second electrical terminals adapted to be connected to the incoming telephone wiring; a removable module disposed between the first and second terminals, the module having space for circuit means and the module having connecting means for electrically connecting the module with the second terminals, cable means coupled to the first terminals and located in the portion of the base covered by the first cover, the cable means including a plug means located at an end of the cable means distant from the first terminals; and jack means located on the module electrically connected to the connecting means for removably receiving the plug means.

According to a further aspect of the invention, the above objects are achieved by a network interface enclosure adapted to interconnect incoming telephone wiring to subscriber premises wiring comprising a base having a wall circumscribing a bottom portion of the base; a first cover covering only a portion of the base, the first cover having individual access panels located thereon; a second cover covering the portion of the base not covered by the first cover, the first and second covers being exposed to the exterior; the first cover enclosing a portion of the base accessible to a telephone subscriber and which contains a plurality of sets of first electrical terminals, each set adapted to be connected to a respective one of the premises wiring of individual subscribers, each set of first electrical terminals positioned so that a respective subscriber may access only one set of first electrical terminals through a respective individual access panel in the first cover; the second cover enclosing a portion of the base accessible to telephone company personnel and which contains a plurality of sets of second electrical terminals, each set of second electrical terminals adapted to be connected to respective incoming telephone wiring; cable means coupled to the first terminals and located in the portion of the base covered by the first cover, the cable means including a plug means at an end of the cable means distant from the first terminals; and jack means located in the portion of the base covered by the first cover, the jack means adapted removably to receive the plug means, and the jack means being electrically connected to the second terminals.

According to this aspect of the invention, an individual subscriber is allowed access to only the terminals connected to his premises wiring. Thus, tampering or accidental interference with other subscriber's terminals located within the same enclosure can be avoided.

BRIEF DESCRIPTION OF THE DRAWINGS

The invention will be described in greater detail in the following detailed description with reference to the drawings in which:

FIG. 2 is a top view of the network interface enclosure of the present invention;

FIG. 3 is a bottom view of the network interface enclosure of the present invention;

FIG. 4 is a right cross-sectional side view of the network interface enclosure of the present invention showing the network interface device disposed within;

FIG. 5 is a bottom cross-sectional side view of the network interface enclosure of the present invention showing the network interface device disposed within;

FIG. 10a is a perspective, exploded view of one embodiment of an individual access panel assembly of the present invention;

FIG. 10b is a perspective view of the individual access panel assembly of FIG. 10a of the present invention;

DETAILED DESCRIPTION

Figure 7:
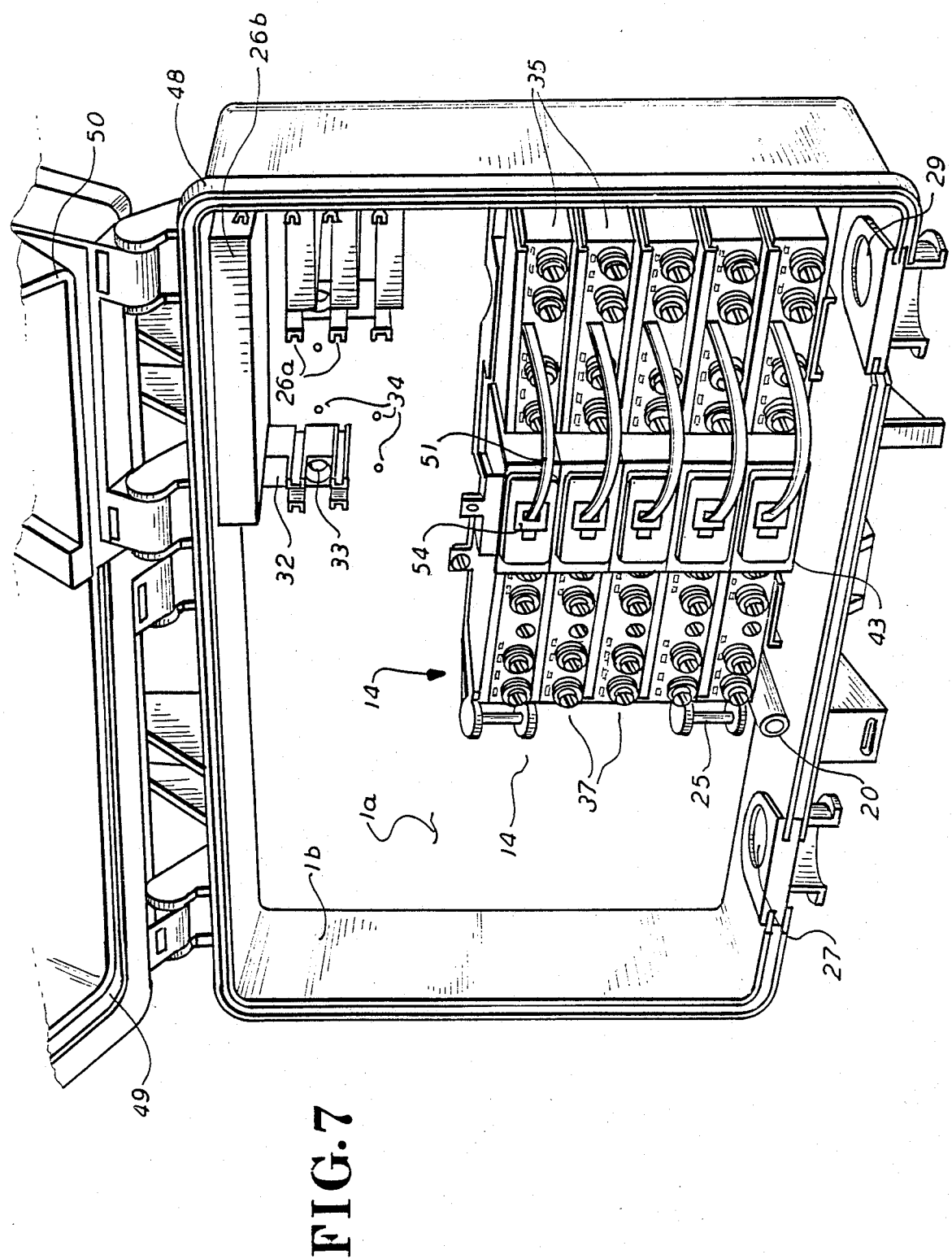
FIG. 7 is a perspective view of the network interface enclosure of the present invention showing both the subscriber access cover opened and the telephone company access cover opened, revealing the network interface device disposed within.

With reference now to the drawings, the network interface enclosure of the present invention preferably comprises a base 1, a first half cover 3 and a second half cover 5. The two covers thus form a so-called "Dutch door" arrangement. Of course, other arrangements are also possible within the scope of the invention. For example, one of the two covers, for example, cover 3, can completely overlap the other cover. Base 1 preferably is molded in plastic and comprises a bottom portion 1a and a wall 1b circumscribing the bottom portion (FIG. 7). The half covers 3 and 5 are hinged at one edge at 7, 8, 9 and 10, as shown. Cover 3 may be secured to an ear 12 of cover 5 via a screw 15 disposed in a tab or portion 17 of the cover 3. Cover 5 may be secured to an integral post 20 of base 1 via a screw 19, which preferably comprises a screw which is not easily removable by a subscriber, requiring a special type of tool with which to remove the fastener, for example, as shown, a special hex head screw. As shown, cover 3 is fastened to cover 5 and preferably overlaps cover 5 by a small amount so as to provide a weather seal, and also so that when cover 5 is opened by telephone company personnel, both covers are opened, providing complete access to the entire base 1. Tab 17 of cover 3 and ear 12 of cover 5 contain respective aligned holes 18 and 31, which can be used to padlock the two covers together, to prevent any subscriber access, if desired. Base 1 also comprises a plurality of mounting ears 21 with which to mount the network interface enclosure to a wall, for example. Base 1 also includes access holes 27 and 29, which may be covered by suitable rubber grommets to provide a weatherproof type of seal. Access hole 29 allows entry of subscriber premises wiring into the network interface enclosure and access hole 27 allows entry of telephone company wiring into the network interface enclosure.

Figure 6:
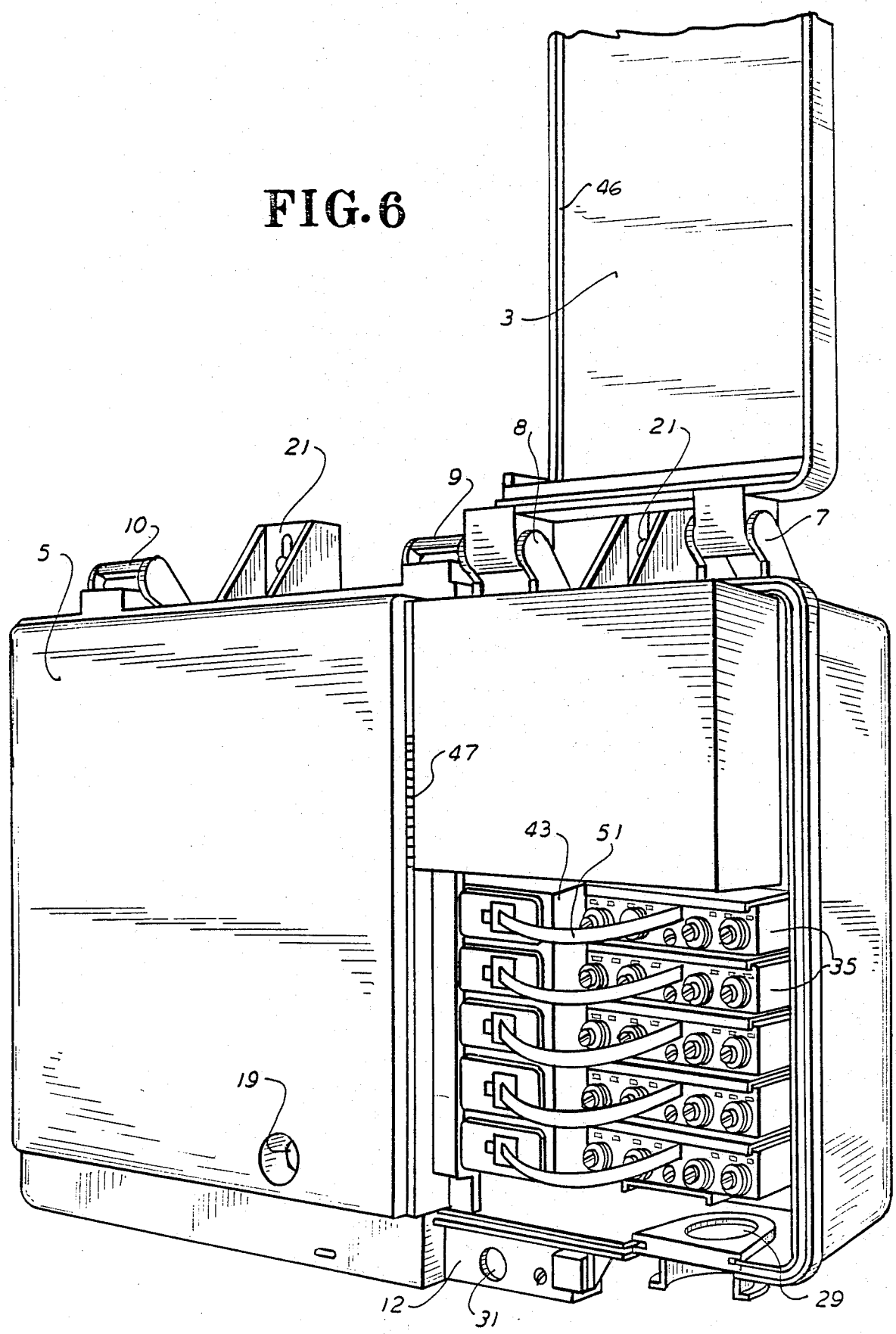
FIG. 6 is a perspective view of the network interface enclosure showing the subscriber access cover opened, revealing the network interface device disposed within.

As shown, a subscriber may obtain access to the subscriber accessible area by opening cover 3. The subscriber attains such access by unfastening screw 15 disposed in tab 17 of cover 3 from the ear 12 of cover 5. As shown in FIG. 6, access to a plurality of sets of first terminals 35 is thereby obtained. These sets of terminals are each coupled to subscriber premises wiring for different telephone lines. As shown in FIG. 6, by opening cover 3, a subscriber does not obtain access to the telephone company wiring or terminals.

Figure 10:
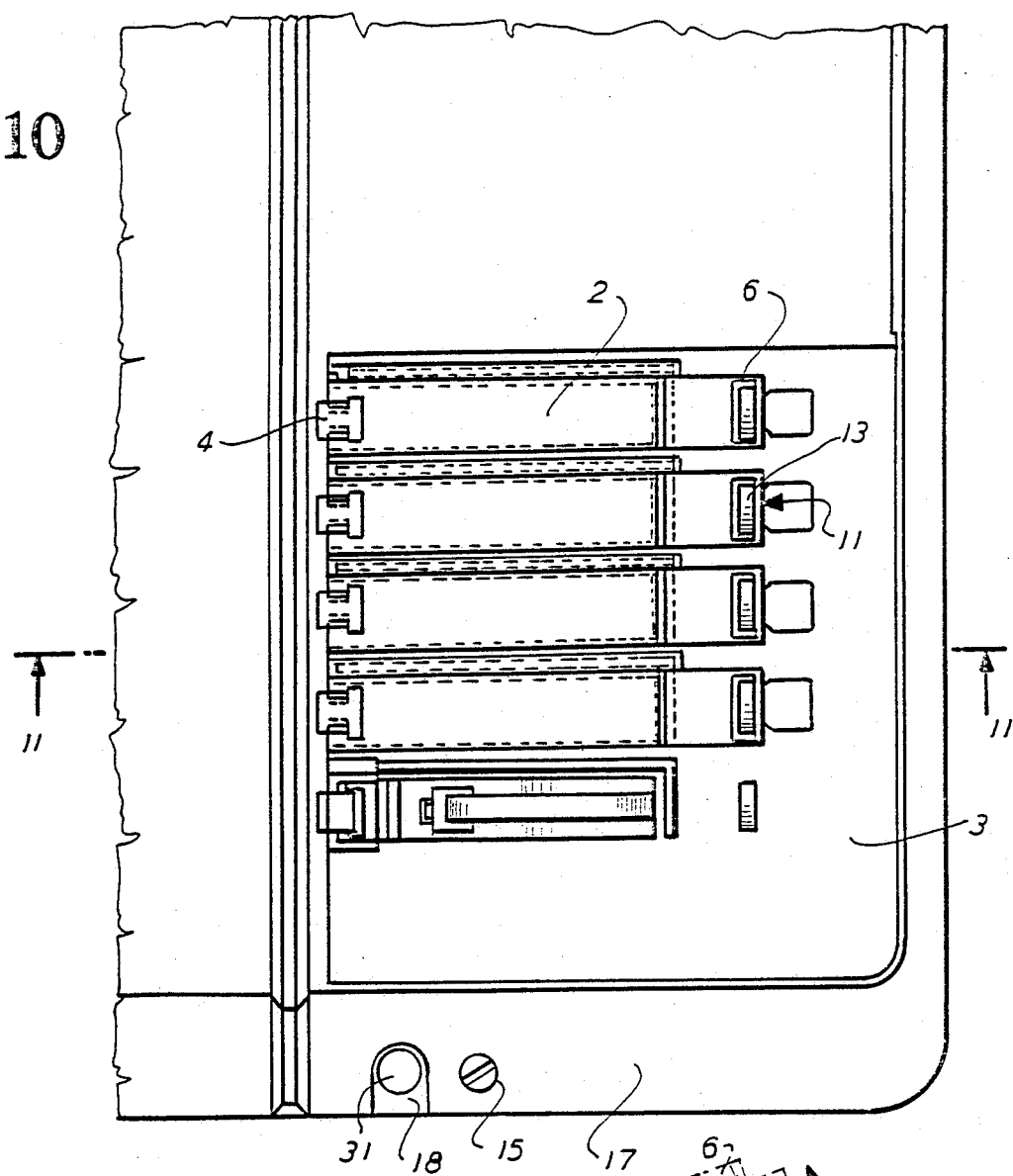
FIG. 10 is a partial front view of the network interface enclosure of the present invention showing the subscriber access cover with individual access panels located thereon.

Cover 3 may additionally include individual subscriber access panels 2 as shown in FIG. 10, 10a, and 10b. The panels are hinged at one end 4 and at the other end have holes 6 which align with protrusions 13 having openings 11 therein so that the panels may each be secured with a suitable locking device such as 26 shown in FIG. 10b. Thus, subscribers may be allowed access to terminals connecting wiring to their premises and denied access to other subscriber's terminals. In the embodiment shown in FIGS. 10a and 10b, protrusion 13 is fastened to the interface enclosure from inside by fastener 28. Thus, if a subscriber misplaces access keys, cover 3 may be opened by the telephone company, protrusion 13 removed from the enclosure via fastener 28, and locking device 26 removed through opening 11. Individual access panels 2 may also include an additional locking device such as screw 30.

As shown in FIG. 10a, individual access door 2 may cover wall-like protrusions 55 which line both sides of opening 56 in cover 3. The dimensions of protrusions 55 and length of cables 51 are preferably such that a cable 51 and modular plug 52 disposed under one access panel could not be connected with a modular jack 54 disposed under another subscriber's access panel, for example, the adjacent panel.

Figure 8:
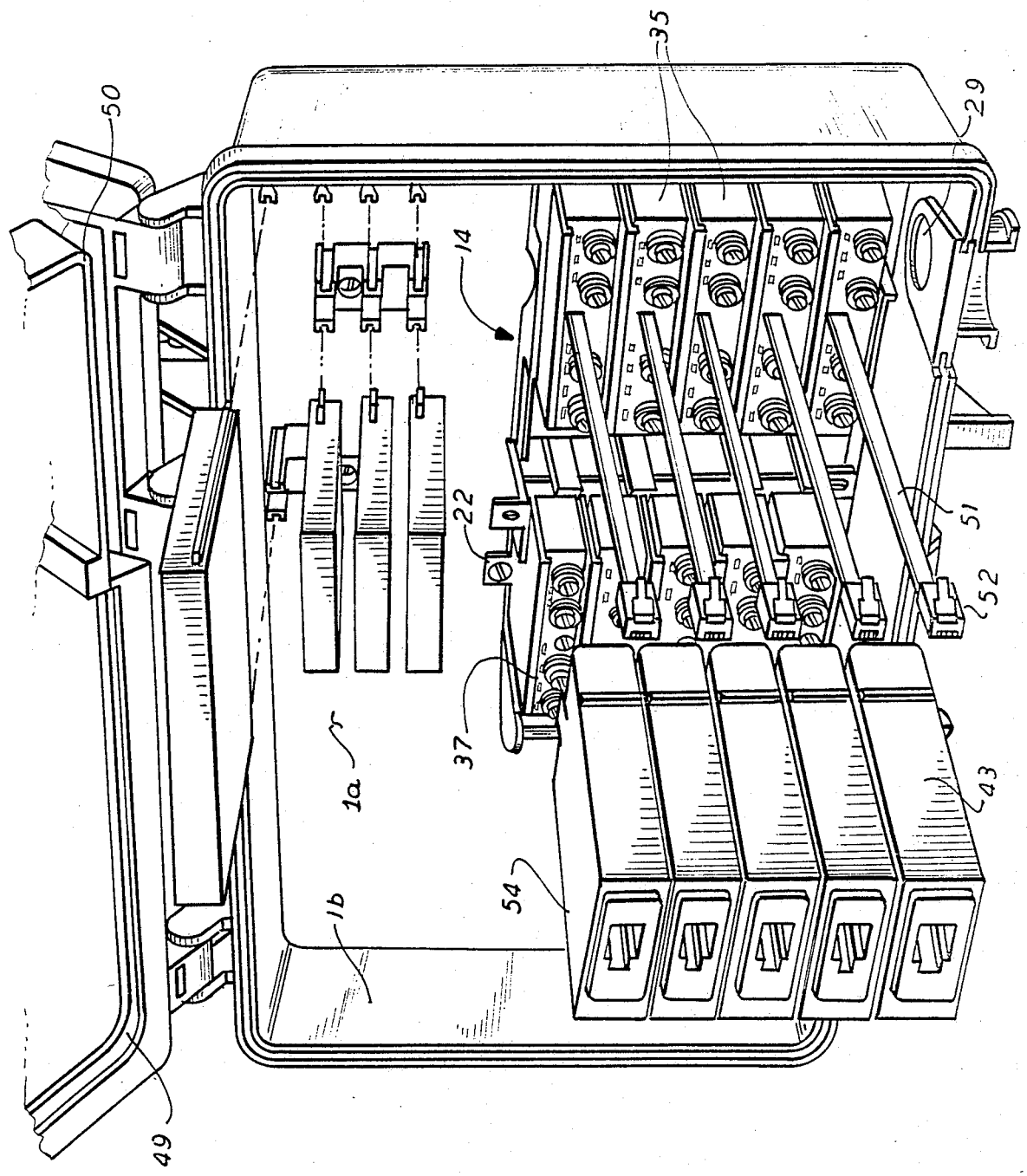
FIG. 8 is a perspective view of the network interface enclosure of the present invention showing both the subscriber access cover opened and the telephone company access cover opened, revealing the network interface device disposed within and showing the removable modules in detached position.
Figure 14:
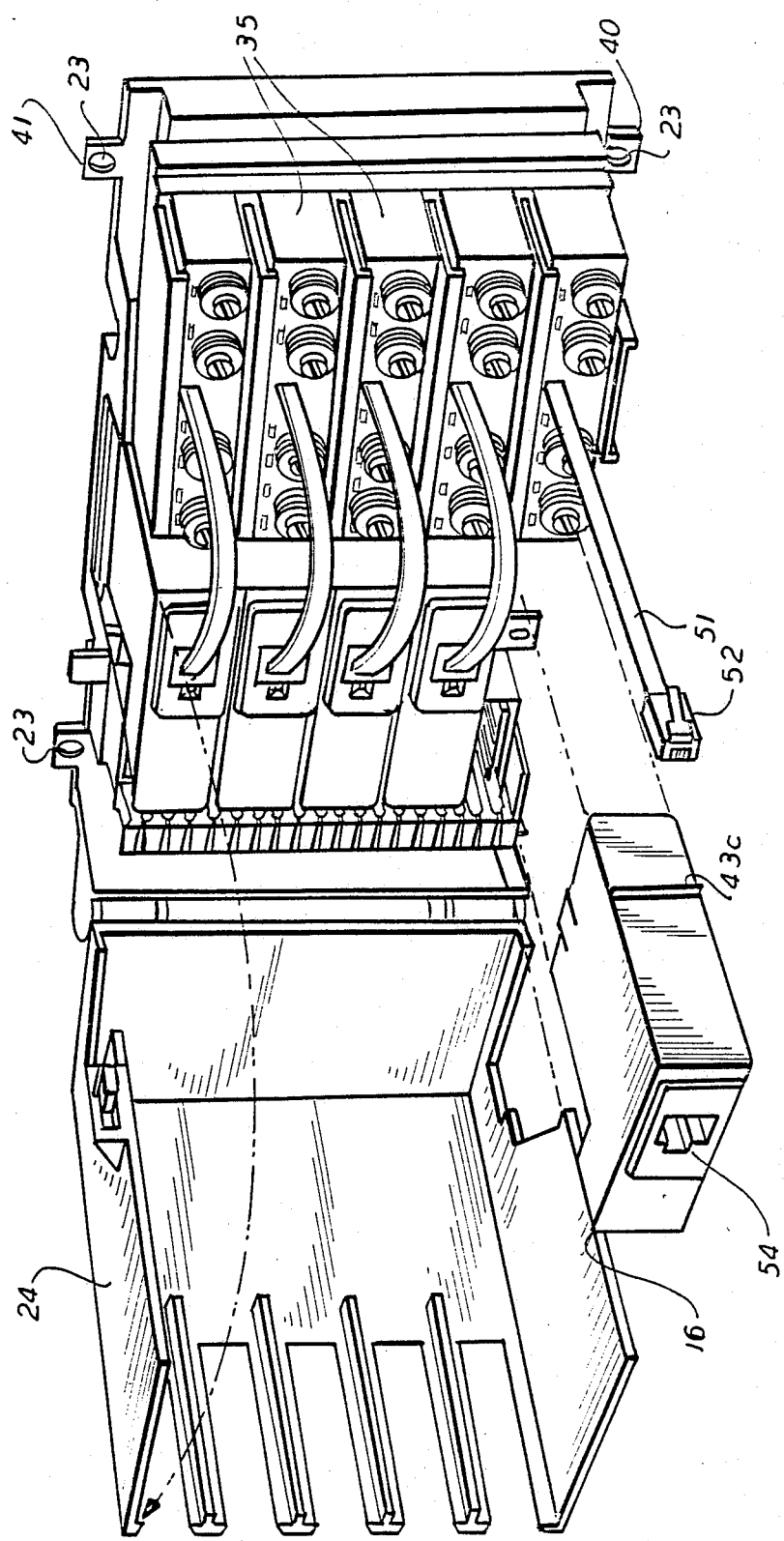
FIG. 14 is a perspective view of the network interface device of the present invention showing the cover of FIG. 12 hingably attached and adapted to cover the telephone company terminals in its open position, revealing a removable module in a detached position.
Figure 16:
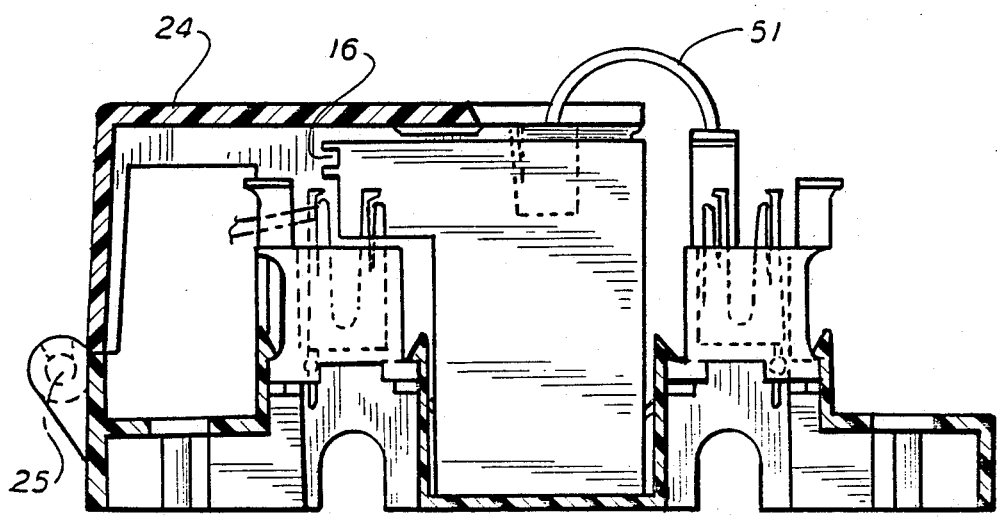
FIG. 16 is a bottom cross-sectional view of the network interface device of the present invention showing the cover of FIG. 12 hingably attached and adapted to cover the telephone company terminals, in a closed position, with yet another embodiment of the subscriber terminals.

As shown in FIG. 7, a plurality, illustratively five, of sets of telephone company terminals 37 are contained within base 1, underneath the portion covered by cover 5. Access to terminals 37 can only be obtained by opening cover 5. Terminals 35 are connected to terminals 37 via a cable 51 having a modular plug 52 adapted to be received in a modular jack assembly 54. The jack assembly 54 is located on a removable module 43 which is capable of housing various types of circuits, as evident in FIG. 9, such as Maintenance Termination Units (MTU's), Remote Isolation Devices (RID's), and Half-Ringers. As shown in FIG. 8, the module 43 is readily removable from its position between the subscriber and telephone company terminals and can have finger tabs 16 (see FIGS. 14 and 16) integrally molded on it to facilitate removal. Suitable electrical conductors 54a and 37a interconnect jack 54 on module 43 with the telephone circuit 43a disposed in the module and with respective ones of the terminals 37. See FIG. 9.

Figure 1:
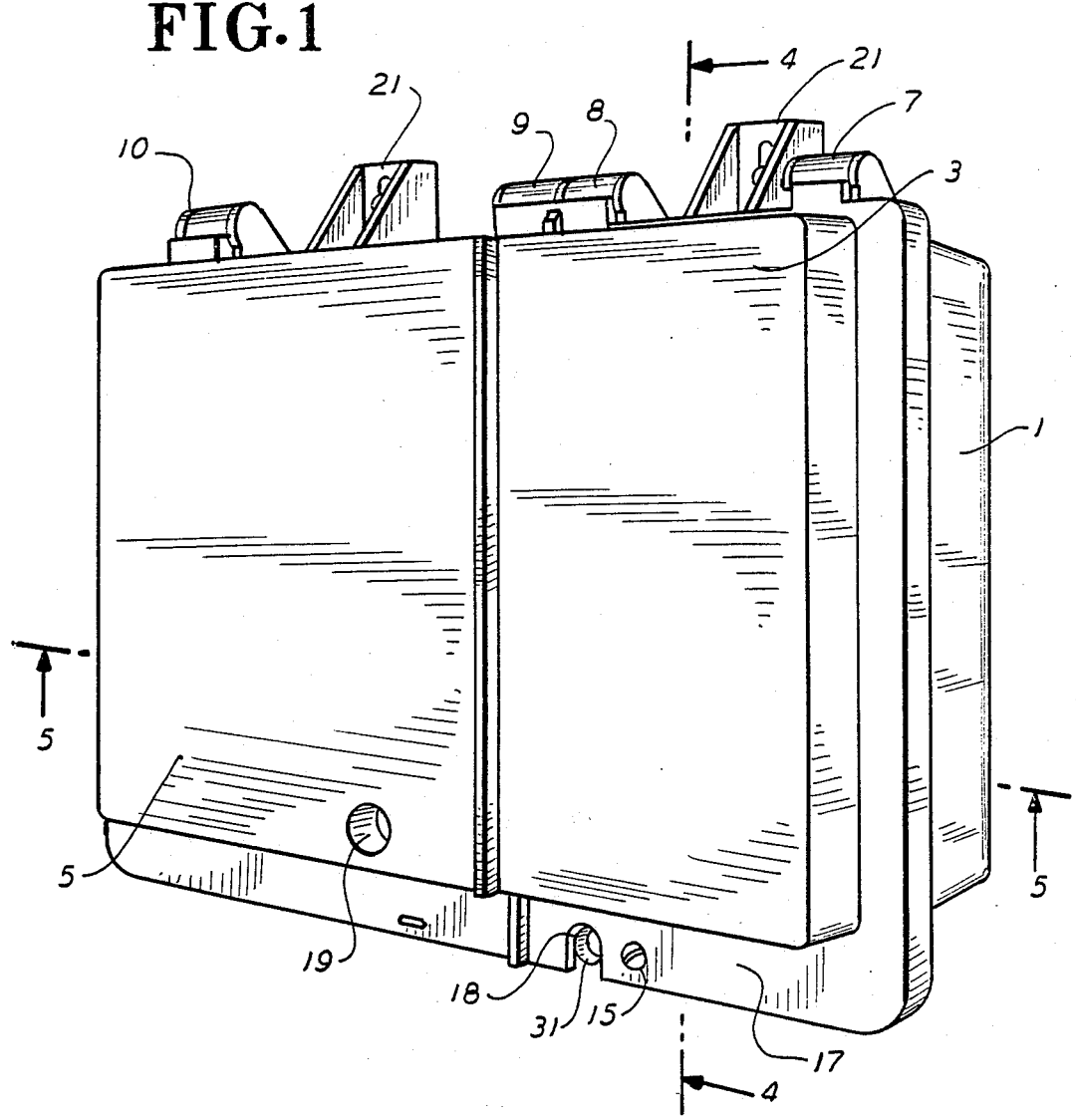
FIG. 1 is a perspective view of the network interface enclosure in its closed condition.
Figure 9:
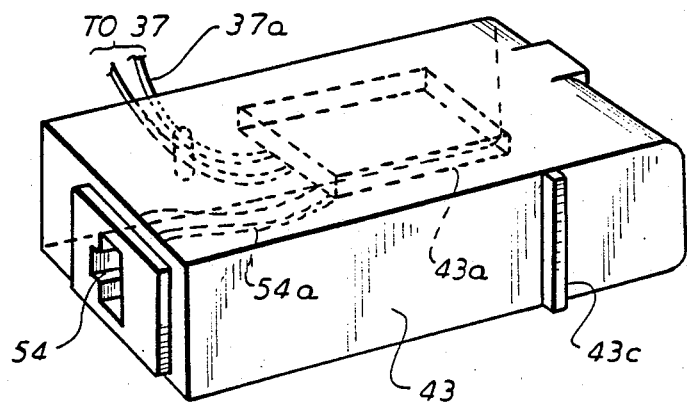
FIG. 9 is a perspective view of a network interface module of the present invention.
Figure 11:
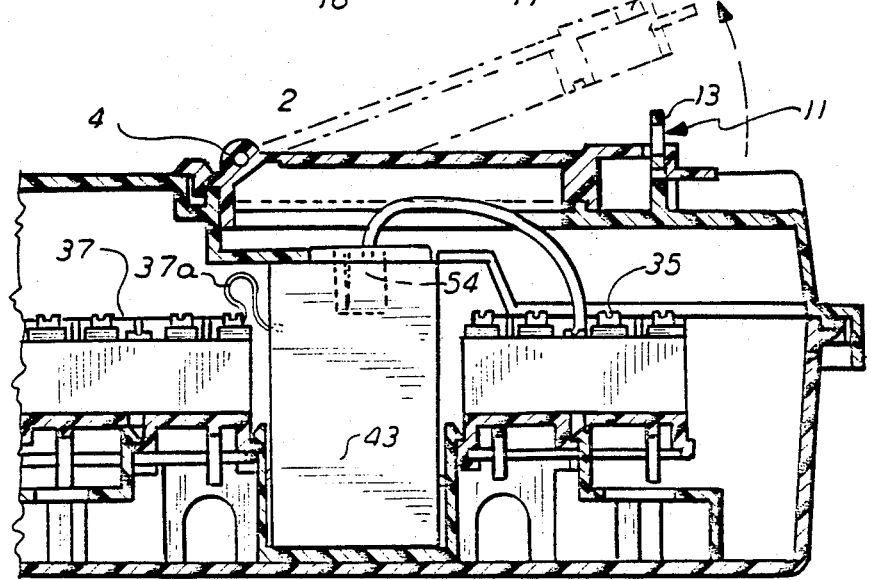
FIG. 11 is a partial cross-sectional side view of the network interface enclosure of the present invention, showing an individual access panel of the subscriber access cover while being opened.
Figure 13:
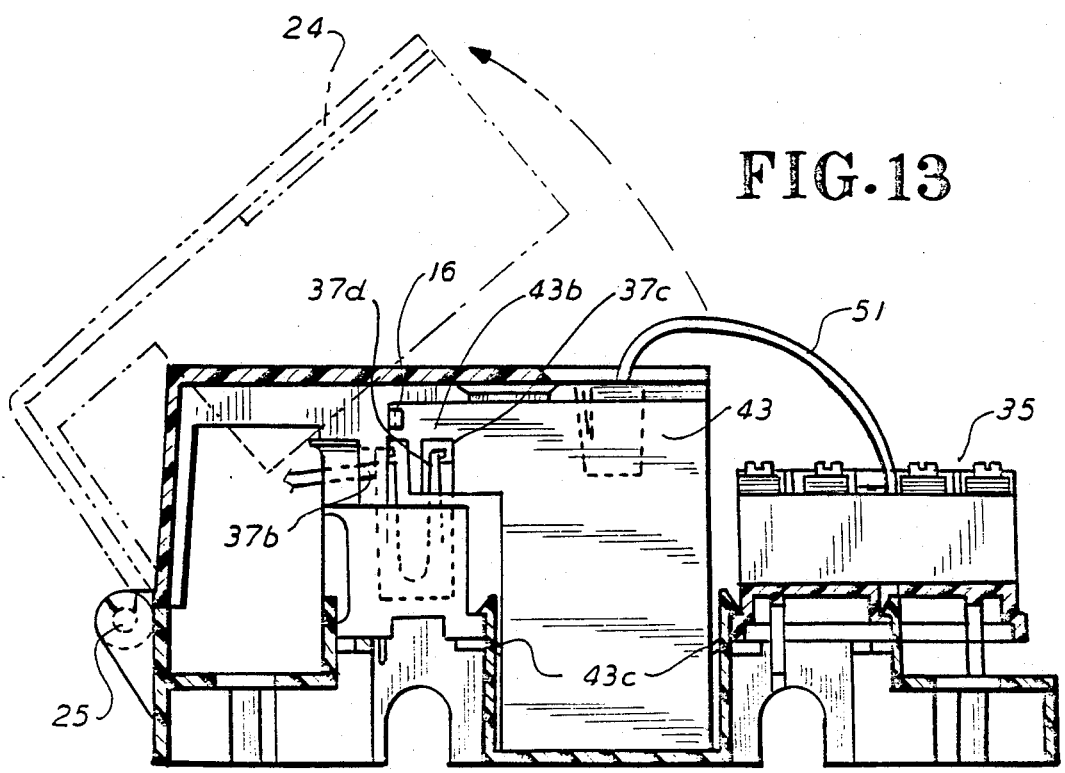
FIG. 13 is a bottom view of the network interface device of the present invention showing the operational aspects of the cover of FIG. 12 hingably attached and adapted to cover the telephone company terminals.

Different embodiments of the module are shown. In FIG. 9, the module is coupled to terminals 37 by suitable conductors 37a, also shown in FIG. 7 and FIG. 11. In FIG. 13, module 43 includes extension 43b having a slide-on connector 37c therein for receiving push-in connection 37d. A telephone company wire 37b is shown inserted between the knife-like edges of connector 37d in FIG. 13. The module also includes snap-connector 43c which allows its retention by a suitable receiving snap member molded into the device housing. Snap-connector 43c may comprise a bead molded into module housing 43, as shown in FIG. 9.

In order to determine whether a fault exists in the telephone company owned wiring or the subscriber premises wiring, a subscriber (or telephone company personnel) opens cover 3 of the network interface enclosure, leaving cover 5 closed. Depending upon which line is associated with that subscriber, the subscriber disconnects one of the modular cables 51 coupled to terminal 35 having modular plug 52 from the modular jack 54. The subscriber then inserts an operating telephone into modular jack 54. If the telephone operates normally, then the subscriber can assume that the fault is within the subscriber's own wiring. If the telephone still fails to operate, then the subscriber can assume that the fault exists in the telephone company owned wiring.

Telephone company personnel can obtain complete access to the interior of the base by unfastening fastener 19 from post 20. Since cover 5 is at least partially overlapped by cover 3, and cover 3 is fastened to cover 5, undoing fastener 19 allows both covers 3 and 5 to be opened.

As shown in the figures, covers 3 and 5 include a channel type seal 49 and 50 adapted to receive the edge of wall 1b in order to better protect the interior of the network interface enclosure from the environment, if the device is located externally. A seal 48 may be placed across the top of the base 1. A channel type seal can also be provided along the line where the two doors 3 and 5 overlap, as shown at 46 and 47.

Channels 26a may be formed within the network interface enclosure by upstanding projection 32 secured to the bottom portion of the base 1a by screws 33 fastened in holes 34, so that additional telephone system circuits and devices, for example, impedance matching and signature devices, can be disposed within the network interface enclosure, at locations other than inside modules 43. See FIG. 7. An example of such a device is shown at 26b. Channels 26a may accommodate various sized telephone system circuits and devices by loosening screw 33, moving projections 32, and refastening screw 33 and projection 32 in the appropriate hole 34.

Figure 12:
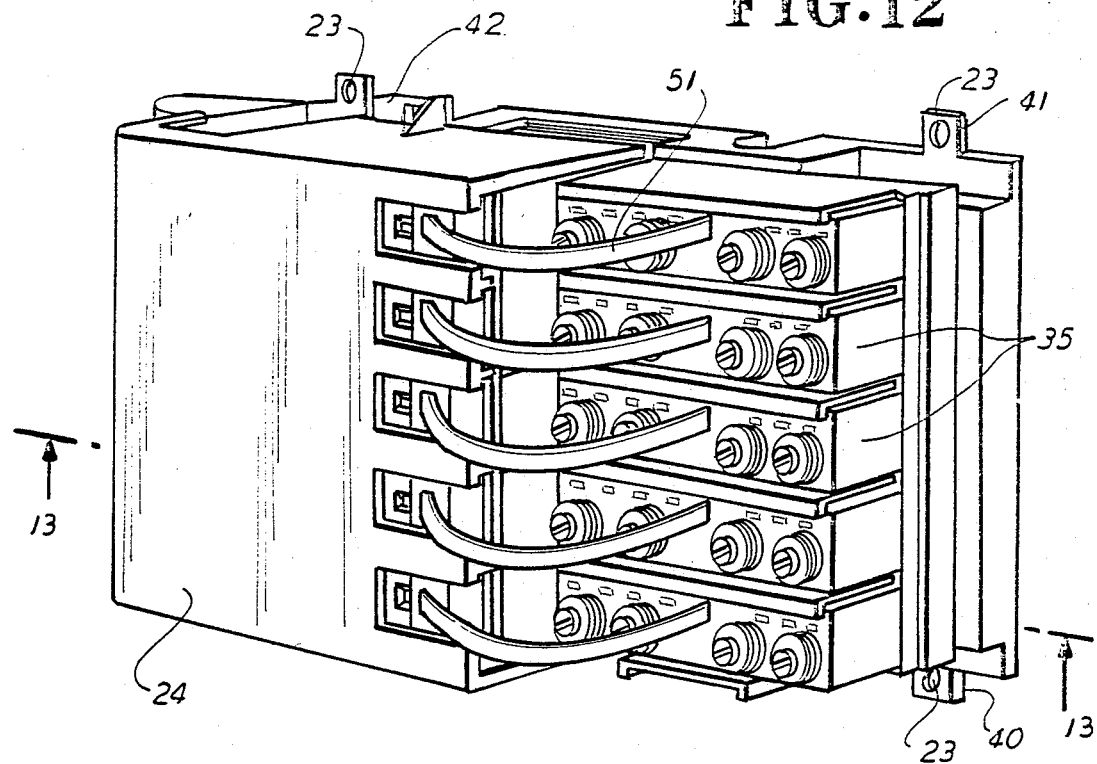
FIG. 12 is a perspective view of the network interface device of the present invention showing a cover hingably attached and adapted to cover the telephone company terminals, and in its closed position.

As shown in FIGS. 7 and 12, the entire network interface device 14 is removable from base 1 of the network interface enclosure by unfastening screws 22 through holes 23 in tab sets 40 and 41. When removed, a cover 24 hinged at 25 may be provided which prevents access to the telephone company terminals 37 while allowing access to the subscriber terminals 35 and module jacks 54 and plugs 52. The device 14 may be provided without an enclosure, for example, where prevention of access by subscribers is not a significant concern or where a weather seal is not important, i.e., for indoor mounting. Thus the network interace device without the enclosure may be used, for example, indoors and still achieve the objectives of the present invention.

Figure 15:
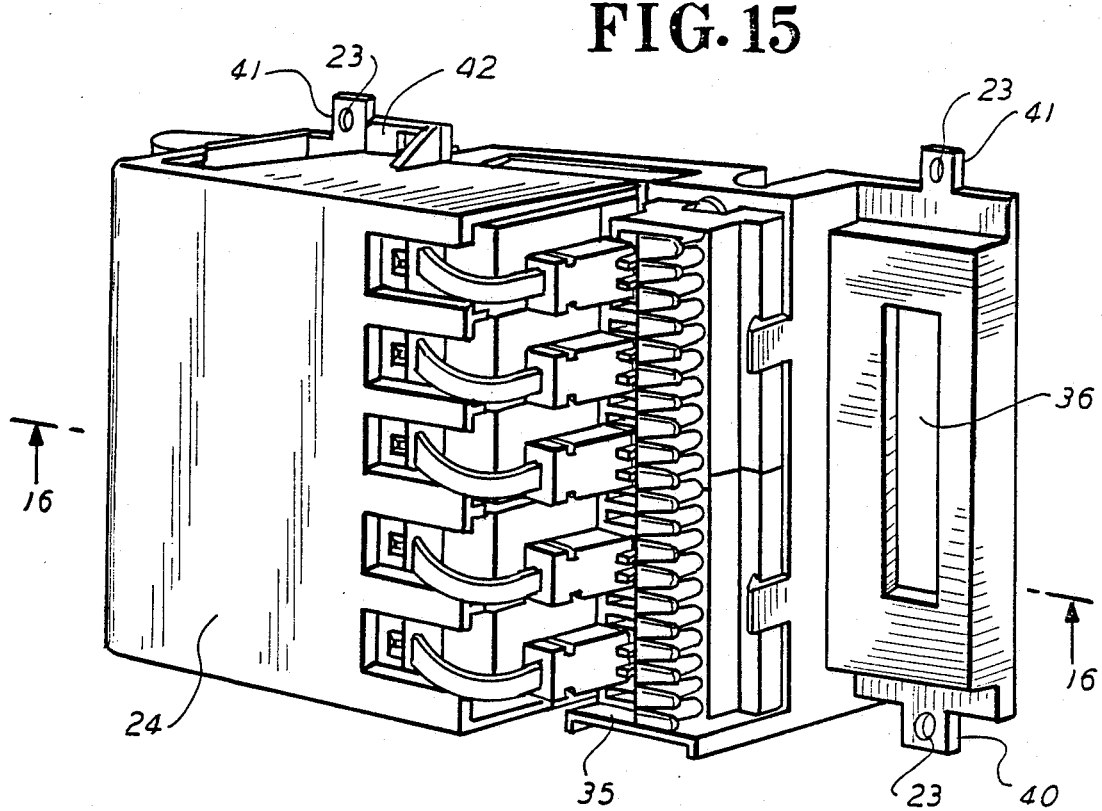
FIG. 15 is a perspective view of the network interface device of the present invention showing the cover of FIG. 12 hingably attached and adapted to cover the telephone company terminals, in a closed position, with an alternative embodiment of the subscriber terminals.

As shown in FIG. 15, opening 36 may be provided in order to accommodate a standard telephone jack, for example, a 25 wire pair jack. Thus, the plurality of subscriber terminals 35, may be electrically connected to the jack disposed in aperture 36 so that the plurality of subscriber terminals may be serviced through one plug and jack. Although not illustrated in the drawings, an additional opening may similarly be provided on the telephone company terminal side of the network interface device so that the plurality of the telephone company terminals 37 may also be serviced by one plug and jack.

Figure 17:
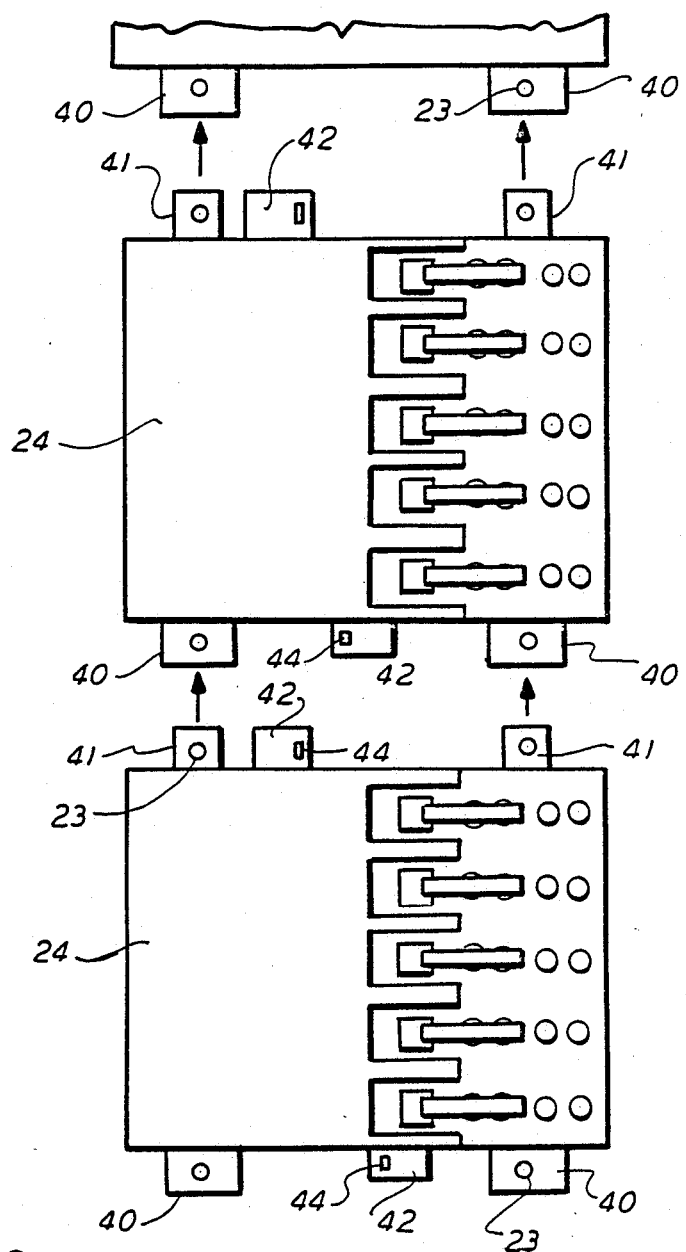
FIG. 17 is a front schematic view showing several network interface devices of the present invention in stacked position with locking tabs staggered on either side.
Figure 18:
FIG. 18 is a cross-section of a mounting tab of the network interface device of the present invention.

Further, a plurality of network interface devices 14 may be adjacently stacked, e.g., along a wall, as illustrated in FIG. 17. When the devices 14 are stacked, mounting tab sets 41 slides into and cooperates with mounting tab sets 40 so that flush mountings of devices 14 are obtained. FIG. 18 shows a cross-section of mounting tab 40 of devices 14. As shown, it is channel shaped so that it receives tab 41. Locking devices 42 for covers 24 are staggered on either side of each device 14 so that when the devices 14 are stacked, locking devices 42 of adjacent devices 14 do not interfere with each other. If desired, a U-shaped clip may be inserted through holes 44 of adjacent locking devices 42 so that the covers 24 of devices 14 in stacked position may be opened simultaneously.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. A telephone network interface enclosure adapted to interconnect incoming telephone wiring to subscriber premises wiring comprising:
   a base having a wall circumscribing a bottom portion of the base;
   a first cover covering a first portion of said base;
   a second cover covering a second portion of said base not covered by said first cover;
   said first cover enclosing a portion of said base accessible to a telephone subscriber and which contains a plurality of sets of first electrical terminals adapted to be connected to the subscriber premises wiring;
   said second cover enclosing a portion of said base accessible to telephone company personnel and which contains second electrical terminals adapted to be connected to the incoming telephone wiring;
   a removable module disposed between said first and second terminals, said module having internal space for housing a telephone circuit and said module having connecting means for electrically connecting the module with said second terminals;
   cable means coupled to said first terminals and located in the portion of the base covered by the first cover, said cable means including a plug means at an end of the cable means distant from said first terminals;
   jack means located on the module for removably receiving the plug means, said jack means being electrically connected to said connecting means; and
   each set of said plurality of sets of first electrical terminals associated with a respective subscriber's premises wiring, and said first cover further comprising a plurality of individual access panels associated with respective ones of the sets of first terminals so that an individual subscriber may access the set of first terminals associated with its subscriber premises wiring.

2. The telephone network interface enclosure recited in claim 1, wherein a first portion of said module is located in the portion of the base covered by the first cover and a second portion of the module is located in the portion of the base covered by the second cover.

3. The telephone network interface enclosure recited in claim 1 wherein said module is removable and wherein the removable module has finger tabs integrally molded in its housing so that its removal from the interface enclosure is facilitated.

4. A telephone network interface enclosure adapted to interconnect incoming telephone wiring to subscriber premises wiring comprising:
   a base having a wall circumscribing a bottom portion of the base;
   a first cover covering a first portion of said base, said first cover having a plurality of individual access panels;
   a second cover covering a second portion of said base not covered by said first cover;
   said first cover enclosing a portion of said base accessible to a telephone subscriber and which contains a plurality of sets of first electrical terminals, each set of first electrical terminals adapted to be connected to a respective one of the premises wiring of an individual subscriber;
   said second cover enclosing a portion of said base accessible to telephone company personnel and which contains a plurality of sets of second electrical terminals, each set of second terminals adapted to be connected to respective incoming telephone wiring;

individual cable means associated with each of said first terminals and coupled to said first terminals and located in the portion of the base covered by the first cover, said cable means including a plug means at an end of the cable means distant from said first terminals; and individual jack means associated with each of said plug means and located in the portion of the base covered by the first cover and adapted to removably receive its associated plug means, said jack means being electrically connected to respective ones of said second terminals; and each set of first electrical terminals, its associated plug means and jack means positioned so that the respective subscriber may access only one set of first electrical terminals, its associated plug means and jack means through a respective individual access panel in said first cover.

5. The telephone network interface enclosure recited in claim 4, further comprising a removable module disposed between each of said respective sets of first and second electrical terminals, said module having space for circuit means and said module having connecting means for electrically connecting the module with a respective one of said second terminals.

6. The telephone network interface enclosure recited in claim 5 wherein a first portion of said module is located in the portion of the base covered by the first cover and a second portion of the module is located in the portion of the base covered by the second cover, and said jack means is located on said module.

7. The telephone network interface enclosure recited in claim 4 wherein said first cover comprises a plurality of protrusions extending therefrom and said individual access covers each comprise slot means for receiving a respective one of said protrusions, whereby a locking means can be disposed through an aperture in said protrusions for locking said individual access covers.

8. The telephone network interface enclosure recited in claim 7 wherein said protrusion is removably fastened to said first cover by means accessible from an underside of said first cover, whereby said protrusion may be slidably removed along said slot means once said fastening means has been removed.

9. The telephone network interface enclosure recited in claim 8 wherein said aperture in said protrusion is open ended whereby said locking means may be removed without undoing said locking means once said protrusion is slidably removed from said individual access cover.

10. The telephone network interface enclosure recited in claim 4 wherein said first cover comprises wall like protrusions lining both sides of each opening under said individual access panels so that said cables disposed under each of said individual access panels cannot be connected to the jacks disposed under adjacent individual access panels housing the terminals of another subscriber.

11. A telephone network interface enclosure adapted to interconnect incoming telephone wiring to subscriber premises wiring comprising:

a base having a wall circumscribing a bottom portion of the base;

a first cover having a plurality of individual access panels;

a second cover completely overlapping said first cover;

said first cover covering at least a plurality of sets of first electrical terminals, each set of first electrical terminals adapted to be connected to a respective one of the premises wiring of an individual subscriber;

a plurality of sets of second electrical terminals, each set of second terminals adapted to be connected to respective incoming telephone wiring;

individual cable means associated with each of said first terminals and coupled to said first terminals and covered by the first cover, said cable means including a plug means at an end of the cable means distant from said first terminals; and individual jack means associated with each of said plug means and covered by the first cover and adapted removably to receive respective ones of said individual plug means, said jack means being electrically connected to respective ones of said second terminals; and each set of first electrical terminals, its associated plug means and its associated jack means positioned so that the respective subscriber may access only one set of first electrical terminals, its associated plug means and its associated jack means through a respective individual access panel in said first cover.

12. A telephone network interface device for interconnecting subscriber premises wiring to incoming telephone company wiring, comprising:

a container;

a first cover mounted hingedly to said container and provided with a plurality of individual access panels;

a second cover mounted hingedly to said container and for completely overlapping said first cover;

a first set of terminals for connection to said subscriber premises wiring and for being covered by said first cover;

a second set of terminals for connection to said incoming telephone wiring;

a plurality of plugs connected to said first set of terminals and for being covered by said first cover;

a plurality of jacks for connection to said second set of terminals and for being covered by said first cover;

said plugs for being removably inserted into said jacks to interconnect said subscriber premises wiring and said incoming telephone wiring; and said first set of terminals, said plugs and said jacks positioned so that each of said access panels upon being opened provides access to only a portion of said first set of terminals, said plugs and said jacks.

13. A telephone network interface device for interconnecting subscriber premises wiring to incoming telephone company wiring, comprising:

a container;

a first set of terminals for connection to said subscriber premises wiring;

a second set of terminals for connection to said incoming telephone wiring;

a plurality of plugs connected electrically to said first set of terminals;

a plurality of jacks for connection to said second set of terminals;

said plugs for being removably inserted into said jacks to interconnect said subscriber premises wiring and said incoming telephone wiring;

a first cover mounted hingedly to said container and for covering at least said first set of terminals, said plugs and said jacks;

a second cover mounted hingedly to said container and for completely overlapping said first cover; and said first cover provided with a plurality of individual access panels, each panel providing access to only a portion of said first set of terminals, a portion of said plurality of plugs, and a portion of said plurality of jacks upon being opened.

14. A telephone network interface enclosure adapted to interconnect incoming telephone wiring to subscriber premises wiring comprising:

a base having a wall circumscribing a bottom portion of the base;

a first cover covering a first portion of said base, said first cover having a plurality of individual access panels;

a second cover covering a second portion of said base not covered by said first cover;

said first cover enclosing a portion of said base accessible to a telephone subscriber and which contains a plurality of sets of first electrical terminals adapted to be connected to said subscriber premises wiring;

said second cover enclosing a portion of said base accessible to telephone company personnel and which contains a plurality of sets of second electrical terminals adapted to be connected to said incoming telephone wiring;

individual cable means associated with each of said first terminals and coupled to said first terminals and located in the portion of the base covered by the first cover, said cable means including a plug means at an end of the cable means distant from said first terminals;

individual jack means associated with each of said plug means and located in the portion of the base covered by the first cover and adapted to removably receive its associated plug means, each individual jack means electrically connected to one set of said plurality of sets of second electrical terminals; and said plurality of sets of first electrical terminals, said plug means and said jack means positioned so that an individual subscriber may access only a portion of said plurality of sets of first electrical terminals, said plug means and said jack means through one of said individual access panels.

* * * * *

UNITED STATES PATENT AND TRADEMARK OFFICE
CERTIFICATE OF CORRECTION

PATENT NO. : 4,910,770

DATED : Mar. 20, 1990

INVENTOR(S) : Thomas J. Collins, et al.

Figure 19:
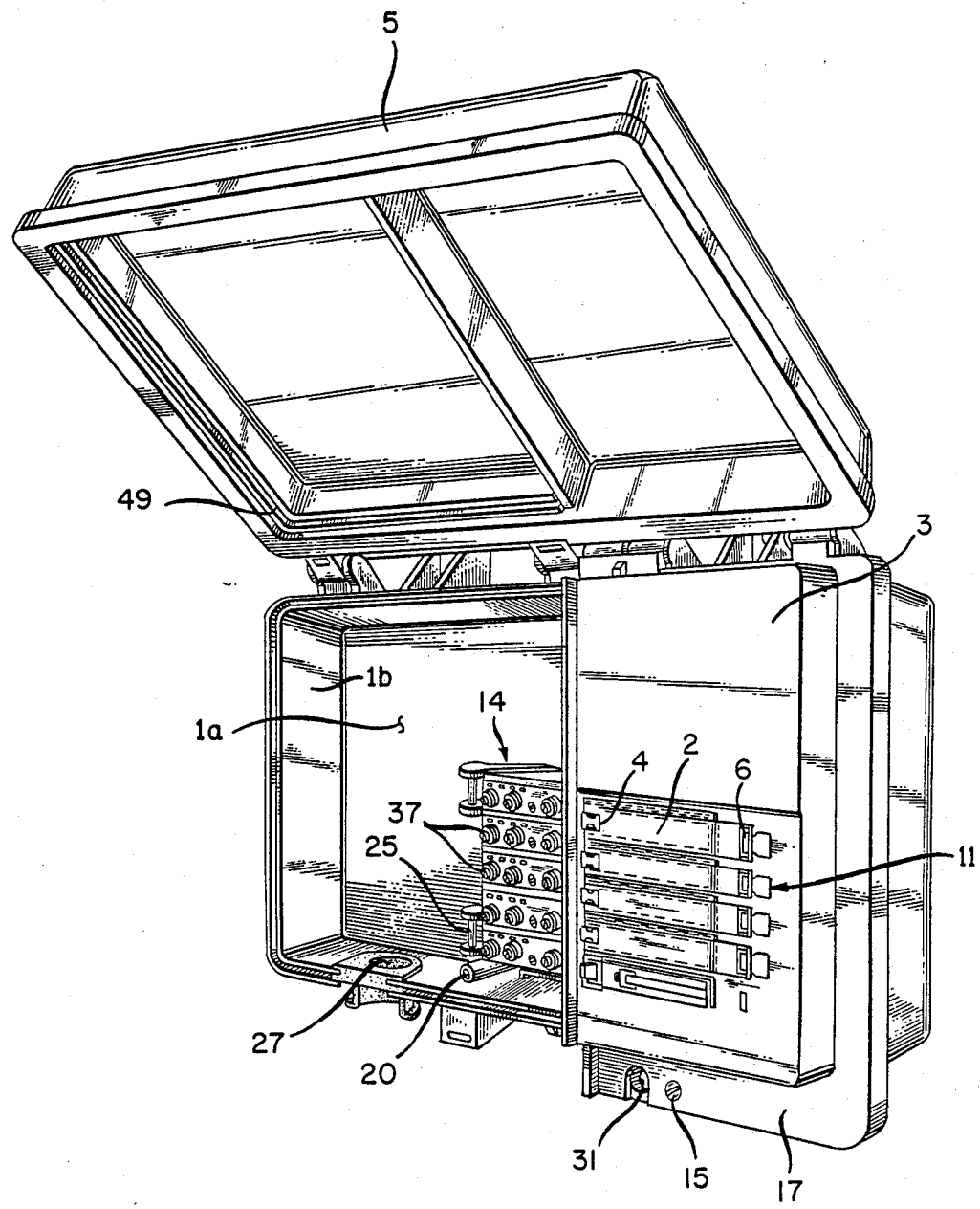
FIG. 19 is a perspective showing a fully overlapping outer cover.
Figure 19:
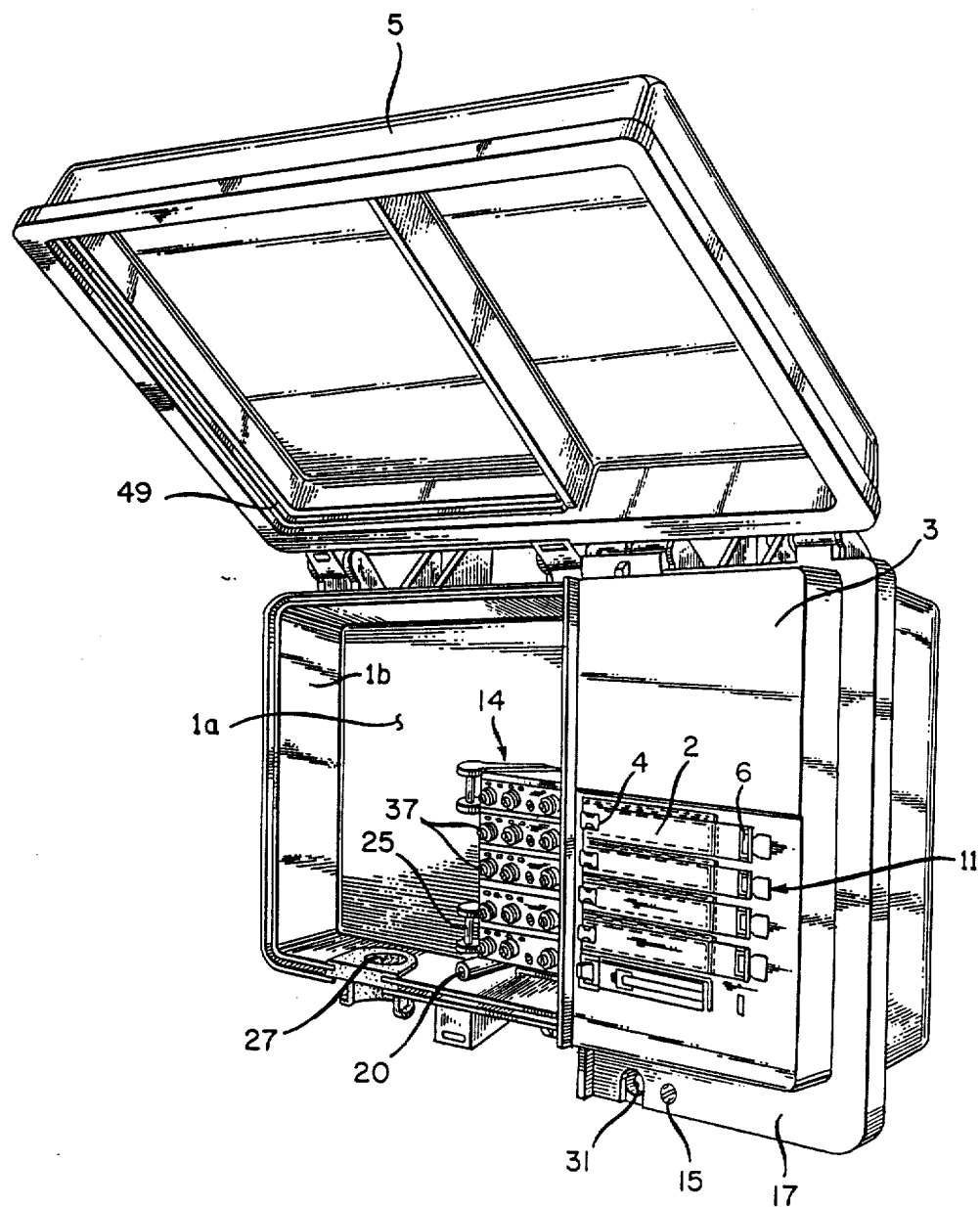

It is certified that error appears in the above-identified patent and that said Letters Patent is hereby corrected as shown below:

The sheet of drawing consisting of Fig. 19 should be added as per attached sheet.

Signed and Sealed this

Twenty-first Day of August, 1990

Attest:

HARRY F. MANBECK, JR.

Attesting Officer      Commissioner of Patents and Trademarks